United States Patent
Schaeffer et al.

[11] Patent Number: 5,979,053
[45] Date of Patent: Nov. 9, 1999

[54] METHOD OF ASSEMBLING A BUTTERFLY DAMPER CAPABLE OF FULLY STOPPING THE FLOW OF AIR AND/OR GASES

[76] Inventors: J. Michael Schaeffer, 6474 E. Mercer Way, Mercer Island, Wash. 98040; Edgar H. Nelson, HC01 Box 268, Kingston, Id. 83839; Kirk T. Nelson, S. 13230 Tamarack Ridge Rd., Cataldo, Id. 83810

[21] Appl. No.: 08/995,718

[22] Filed: Dec. 22, 1997

Related U.S. Application Data

[62] Division of application No. 08/511,004, Aug. 3, 1995, Pat. No. 5,876,015.

[51] Int. Cl.⁶ .................................................... B23P 15/00
[52] U.S. Cl. ............................... 29/890.126; 29/890.124
[58] Field of Search ....................... 29/890.124, 890.126, 29/434, 458; 251/305

[56] References Cited

U.S. PATENT DOCUMENTS

| | | | |
|---|---|---|---|
| 3,485,476 | 12/1969 | Hemphill | 251/283 |
| 3,502,299 | 3/1970 | Phillips | 251/306 |
| 3,601,360 | 8/1971 | Scaramucci . | |
| 3,656,712 | 4/1972 | Bertrem | 251/306 |
| 3,666,235 | 5/1972 | Scott | 251/205 |
| 3,910,555 | 10/1975 | Bertrem et al. | 251/306 |
| 3,960,177 | 6/1976 | Baumann | 137/625 |
| 4,022,424 | 5/1977 | Davis et al. | 251/214 |
| 4,489,917 | 12/1984 | Baumann | 251/305 |
| 4,917,350 | 4/1990 | Beyer et al. | 251/129 |
| 4,996,769 | 3/1991 | Bongart | 29/890.124 |
| 5,102,097 | 4/1992 | Davis et al. | 251/283 |
| 5,826,336 | 10/1998 | Schmitz | 29/890.124 |

OTHER PUBLICATIONS

Norris Butterfly Valves—6 Page Brochure–Currently Available in 1995.

*Primary Examiner*—Irene Cuda
*Attorney, Agent, or Firm*—Roy E. Mattern, Jr.

[57] ABSTRACT

A butterfly damper for installation in duct work through which air and/or gases will be flowing either under a positive or negative pressure has: an outer cylindrical surface structure made of a strong material; an inner cylindrical surface structure made of a resilient material; a circumferential portion of compressible material, which is always tending to return to the non-compressed form thereof, which is initially compressed between the outer cylindrical surface structure and the inner cylindrical surface structure, whereby the inside diameter of the duct body portion, initially, is uniform throughout the length thereof, and, thereafter, when the initial compressive force becomes less effective, the compressive material expands causing radially inward movement of adjacent circumferential portions of the inner cylindrical surface structure; a blade to be moved across the flow of air and/or gases into sealing contact with the radially inwardly moved circumferential portions of the inner cylindrical surface structure, which have been so moved upon the expansion of the compressible material, to thereby stop the flow of air and/or gases; blade mounting components secured to the outer cylindrical surface; and controllable blade movement components movably secured to the blade mounting components. In a preferred embodiment, the blade is elliptical in shape and is mounted slightly offset on a diagonal about a full shaft positioned on a transverse axis. When the blade is closed in the offset diagonal position thereof, the air and/or gas flow is completely sealed, independent of shaft seals.

10 Claims, 6 Drawing Sheets

METHOD OF ASSEMBLING A BUTTERFLY DAMPER CAPABLE OF FULLY STOPPING THE FLOW OF AIR AND/OR GASES

CROSS REFERENCE

This is a Divisional Application of Parent application Ser. No. 08/511,004, filed Aug. 3, 1995, now U.S. Pat. No. 5,876,015.

BACKGROUND

Butterfly dampers for installation in duct work through which air and/or gases will be flowing, have been previously installed. However, none of these previously installed butterfly dampers are believed to be leak free butterfly dampers.

In contrast to these butterfly dampers used in stopping air and/or gas flows, while still allowing some leakage, butterfly valves used in stopping liquid flows are provided to stop liquid flows without leakage. For example, butterfly valves are provided by the Norris/O'Bannon division of the Dover Corporation of Tulsa, Okla. and designated as Norris Butterfly Valves. An elastomer lined R-Series, inclusive of R 1000, R 2000, and R 3000 valves, referred respectively as wafer span type, double rib type, and full lug type, are available in sizes from two inches to thirty-six inches. The liquid pressure rating is two hundred pounds per square inch. The temperature range is minus thirty five degrees to positive two hundred and fifty degrees Fahrenheit. The valve bodies, depending on type, are made from cast iron, ductile iron, cast steel, bronze, and aluminum. Each valve body on the inside is isolated from the flow stream of a liquid by a resilient elastomer link, or seal, and O-ring seals. An angle-disc, i.e. an angle-blade, construction gives a three hundred and sixty degree uninterrupted contact of the disc, i.e. the blade, with the seat provided by using the resilient elastomer material. The disc, i.e. the blade, does not seat in the shaft holes, thereby assuring a bubble tight shutoff of the liquid flow, with no scrubbing of the elastomer in the shaft hole area. Shafts holding and positioning the disc, i.e. blade, are double O-ring sealed to prevent leakage into shaft bearing areas. If needed a field-replaceable resilient seat is bonded to a rigid backing ring to prevent this resilient seat from distorting or collapsing due to high velocity flow of the liquids, or in vacuum service, and during installation. Body O-ring flange seals are used to eliminate the need for flange gaskets. These flange seals can be replaced without dismantling this butterfly valve and replacing the seat. These Norris Butterfly Valves are used in oil-field drilling and production applications, in shipboard ballast systems, cargo handling systems, cooling water systems and as machinery valves.

In respect to U.S. patents finally considered at the conclusion of a U.S. patent Search:

In 1969 in U.S. Pat. No. 3,485,476, James E. Hemphill illustrated and described his butterfly valve having a symmetrical valve disc, i.e. blade, provided with a fin configuration on both sides for reducing the hydrodynamic torque on the valve disc, so as to reduce the torque necessary to position the valve disc within the flow passage in the valve housing;

In 1970, in U.S. Pat. No. 3,502,299, Donald R. Phillips disclosed his resilient liner for butterfly valves, which he noted is an improved resilient liner in respect to one disclosed in U.S. Pat. No. 3,314,641. The valve body has an internal receiving space to receive resilient lining material. The overall configuration is such that the cold flow of the resilient material is effectively utilized to seal the resilient material, formed as the liner, against the valve body, and the internal receiving space thereof. Importantly, when achieving this sealing, the cold flow of the sealing material is prevented from materially effecting the internal diameter of the disc, i.e. blade, engaging portion of this resilient material liner. To accomplish this result, the overall resilient seat is composed of two basic elements. One element is an enclosed reinforcing member made of hard rubber, plastic, metal or so forth, and it s tubular in configuration. The other element is an encompassing resilient tubular liner member, which encompasses the reinforcing member, as these two elements are positioned in the internal receiving space of the valve body;

In 1971, in U.S. Pat. No. 3,601,360, Domer Scaramucci. illustrated and described his disc valve assembly with a tilt-in valve member. His valve can be quickly and easily assembled and disassembled, thereby facilitating the manufacture and field repair of his disc valve assembly. Further, since the disc valve member, and the seat assembly for it, are both insertable axially, via the same end of the valve body, both components can be removed from the valve body, by simply removing one flange, thereby reducing the time required during field repair of the valve assembly;

In 1972, in U.S. Pat. No. 3,656,712, Bradley E. Bertrem disclosed his butterfly valve for mounting between removable flanges. Also one of the two flanges can be removed when the valve stays closed, while retaining fluid pressure in the flow passageway. In providing his butterfly valve, he included a resilient liner of a length equal to or less than the length of the butterfly valve body, so no part of the resilient liner extends beyond the butterfly valve faces. This resilient liner included two portions. The first portion, which is not resilient, is an outer circumferential portion or backing ring made of metal or of some non-metallic material such as plastic. This backing ring is stiff to lend strength and support to the overall liner. The second portion is an inner circumferential resilient portion, which encompasses most of the backing ring and determines the flow passageway, having a reduced internal diameter resilient portion, thereby forming a valve seating resilient surface portion. When the disc, i.e. blade, of his butterfly valve is rotated to the closed position, its annual seating non-resilient surface is engaged into full sealing contact with the reduced internal diameter resilient portion of the second portion of the overall liner;

In 1972, in U.S. Pat. No. 3,666,235, Arthur A. Scott illustrated and disclosed his throttling butterfly valve. The strong housing has a seat contoured along a generally frusto or semi-spherical surface, which includes a throttling slot. The disc, i.e. blade, is made of at least two portions. One portion is a disc-like metal insert welded to a metal shaft. The other portion is a resilient material molded about the metal insert and formed to have a frusto-conical outer wall, having, in turn, a sealing lip. When the disc, i.e. blade, is rotated, the sealing lip fully contacts the frusto or semi-spherical surface of the housing, i.e. body portion, of this butterfly valve, to thereby completely stop the flow of fluid through this throttling butterfly valve;

In 1975, in U.S. Pat. No. 3,910,555, Brad E. Bertrem and Dennis L. Young disclosed their butterfly valves disc with a dovetail groove. Their patent is assigned to the Dover Corporation of Tulsa, Okla., which has the division known as Norris/O'Bannon. The valve products are referred to as Norris Butterfly Valves. In their patent they describe how a metal disc, i.e. blade, has a dovetail groove in the circumferential edge thereof to receive and to position a compliant member in the form of a torous having an original circular cross-section, receiving ninety percent of the volume of the torous member. The dovetail groove has: an entrance section having sidewalls parallel to the plane of the disc; then a diverging section with sidewalls at an angle of thirty degrees to the plane of the disc; a converging section with the sidewalls approximately forty-five degrees to the plane of the disc; and the bottom of the groove is of a circular cross-section tangent to the walls of the converging sections. The extending ten percent of the original torous compliant member makes the sealing contact with a metal seat.

In a brochure this Norris Butterfly Valve is referred to as a metal seated butterfly valve, which incorporates an elastomeric O-ring seal in the periphery of the disc edge. A metal insert space, referred to as a seat, is machined for the O-ring to be seated therein. In the same brochure, resilient seated butterfly valves are illustrated and described, wherein the entire seat is made of a resilient material, specially formed to be contacted by the periphery of an angularly positioned and moved disc, which, when seated on the resilient seat, creates a positive, bubble tight shutoff of the liquid flow, with a three hundred and sixty degree uninterrupted contact between the angle disc and the rubber seat. Because the flow stream never touches the body of this butterfly valve, there is no need for having a costly high-alloy body, even in corrosive service. The resilient elastomer seats, which are highly resistant to deterioration, are easily replaced on-site in minutes;

In 1976, in U.S. Pat. No. 3,960,177, Hans D. Baumann illustrated and described his low torque and low noise butterfly valve disc of an oval shape. This disc is mounted for rotation, so this disc is tilted, when in the closed position. The disc has a flat machined rim for closely contacting the inner wall of the bore of this butterfly valve, In 1977, in U.S. Pat. No. 4,022,424, Donald H. Davis and John G. Mossey, disclosed their shaft bearing and seals for butterfly valves used to control the flow of steam, having multiple pressure chambers, seals, and a bearing, which collectively make an effective overall shaft end seal, even in the presence of flexures of the shaft;

In 1984, in U.S. Pat. No. 4,489,917, Hans D. Baumann illustrated and described his low torque valve disc for lined butterfly valves. The rubber lining extends the full flow length of this valve metallic housing. The disc, i.e. blade, has an oval shape and a flat rim, in turn having a slightly rounded corner. This corner is the terminating outer periphery of the disc, which makes the sealing contact with the inner resilient wall of this butterfly valve, when the disc is in a tilted closed position.

In 1990, in U.S. Pat. No. 4,917,350, Barry C. Beyer and Thomas M. Pendergrass disclosed their gasketless air damper installed in room circulating air ducts of a ventilation system of a building, wherein one thermostat is used to control the temperature in several different rooms. Their gasketless air damper quietly modulates the airflow to a room, and when necessary is closed, creating a tight mechanical seal with low air leakage. There are no discrete gaskets or seals, which otherwise would be capable of becoming loose or worn with the passage of time; and In 1992, in U.S. Pat. No. 5,102,097, Brian K. Davis, Marshall U. Hines, Larry K. Ball, and Stephen R. Cronenberg, illustrated and described their butterfly valve with a plural-fence modular plate. They selectively added rim like portions, they called fences, to the periphery of their flow modulator, i.e. disc, i.e. blade, to achieve substantial reductions in the aerodynamic or hydrodynamic torque exerted on the modulator.

This background information derived from the Norris Butterfly Valves brochure and the selected U.S. Patents, provides the understanding of how butterfly valves used in controlling both air and/or gases, and liquids have been made with metallic components, often machined, and with resilient material components, often specially formed recesses or seats, which in turn were specially cast or machined.

There remains a need, however, for a comparatively lower cost, easily manufactured, quickly installed, freely operated, highly reliable, zero leakage butterfly valve for controlling and stopping the flow of air and/or gases, often susceptible of carrying abrasive particles and corrosive substances in duct work. Moreover, preferably, the butterfly damper body, blade, shaft, and connecting parts can be made out of all types of thermo-setting resin plastics, all types of thermoplastic materials, urethane, and castable plastics and rubbers, as all respective specifications and service environments for the butterfly damper may call for.

SUMMARY

A butterfly damper for installation in duct work through which air and/or gases will be flowing either under a positive or negative pressure, which oftentimes may be carrying abrasive particles and/or corrosive substances, has an inner flexible cylindrical surface structure made of a resilient material, which via the manufacturing process, is, in part, moved radially inwardly, to provide a seating and sealing surface structure to be in contact with the blade, stopping the flow of the air and/or gas, making this butterfly damper leak free, when tested under the pressure of six inches of water.

During various selected manufacturing processes such as: fiberglass reinforced plastic tension windings of fiberglass strands in the presence of resin about a mandrel; injection moldings of plastic about a removable core, referred to as a mandrel; and circumferential positioning or lay up of initially planar plastic materials formed about a removable core, referred to as a mandrel; the resilient material is placed about the mandrel as a removable sleeve. Then a circumferential strip of compressible material, which is always tending to return to the non-compressed form thereof, is placed about a central portion of the resilient material. Thereafter, this compressible material, depending on the manufacturing process, is compressed, either by the tension windings of fiberglass strand materials in the presence of resins, or by the winding of a binding material, under tension, about the resilient material arranged as a removable sleeve on the mandrel. Subsequently, when the combined: then formed outer cylindrical surface made of a fixed strong material; the compressed circumferential strip of compressible material; and the inner cylindrical surface structure made of a resilient material, are removed from the mandrel, the initial compressive force becomes less effective. Therefore, the circumferential strip of compressible material expands, causing the radially inwardly movement of the central portion of the resilient material of the inner flexible cylindrical surface structure, which become the sealing and seating surface structural portion of the duct body portion of this butterfly damper.

Preferably, the blade of this butterfly damper is made elliptical and mounted to be slightly offset on a diagonal, when seated and sealed against the radially inwardly moved surface structural portions of the resilient inner cylindrical surface structure. In such position, the air and/or gas flow is stopped and completely sealed, independently of any reliance on downstream seals placed around a shaft on which the blade is mounted.

If after an extended period of use under adverse abrasive and/or corrosive conditions, the seating and sealing locale of the inner cylindrical surface structure made of a resilient material should partially or completely fail, the duct body portion, via the outer cylindrical surface structure made of a strong material, still matches the operational strength requirements, or specifications, of the overall duct work.

Preferably the blade is made of front and back portions fitted about a shaft which commences as a full shaft, or becomes a full shaft upon assembly of the butterfly damper. Although preferably, the resulting blade position is offset on a diagonal, the full shaft supporting the blade is arranged as a transverse full diameter shaft.

Preferably, one end of the shaft is positioned within an airtight boss end mounting, in which shaft bearings and O-rings are also mounted. The other shaft end, which extends to be connected to an actuator, is partially positioned in a mounting, in which shaft bearings and O-rings are also mounted. The close fitting tolerance between the shaft portions passed through openings in the resilient material of the inner cylindrical surface structure in effect creates seals at these openings.

Preferably, the materials selected for manufacturing this butterfly damper are thermosetting resin plastics, all thermoplastic materials, urethane, and castable plastics and rubbers. These materials are used in making these butterfly dampers in sizes ranging, for example, from four inches to ninety-six inches in diameter.

The flow of air and/or gas through these butterfly dampers is nearly a laminar airflow, substantially reducing any static pressure loss associated with butterfly dampers. The resulting configuration and the manufacturing methods pertaining to this butterfly damper, eliminate the need for any special machining, such as the need to machine a butterfly damper duct body portion to be a seating and sealing surface structure, or to machine a butterfly damper duct body portion, to thereafter receive a separately machined and inserted raised seating and sealing surface structure. Such machined butterfly damper duct body portions generally are associated, during air and/or gas flows, with higher static pressure losses.

DRAWINGS OF THE PREFERRED EMBODIMENTS

A butterfly damper for installation in duct work, through which air and/or gases will be flowing, which, when fully closed, completely stops the air and/or gas flow, and, when fully opened, insures the air and/or gas flow will flow past the blade of the butterfly damper in a laminar flow, is illustrated in views in the drawings, along with schematic views in the drawings indicating various manufacturing procedures for making these butterfly dampers.

The figures of these drawings are:

FIG. 7 is a partial exploded perspective view of the butterfly damper, having the two flanges, illustrating various parts in their respective unassembled relative positions, indicating: the cylindrical sleeve which becomes the inner cylindrical surface structure made of a resilient material; the cylindrical portion of compressible material, which eventually is positioned adjacent the outer central portion of the cylindrical sleeve, and initially compressed for subsequent later partial expansion, which effectively reduces the internal diameter of a portion of the cylindrical sleeve of resilient material; the blade; a shaft portion for mounting the blade; bearing supporting the shaft portion; the hand control for turning the blade; and mounting structure for one end of the shaft portion and the bearings, inclusive of the sealing ring, to secure all of them as a subassembly to the outer cylindrical surface structure;

DESCRIPTION OF PREFERRED EMBODIMENTS OF THE BUTTERFLY DAMPER AND METHODS OF MANUFACTURING THE BUTTERFLY DAMPER

Introduction

The butterfly damper 30, illustrated in the drawings, is a leak free damper when fully closed, and when fully opened the air and/or gas flow passing through the butterfly damper is passing in an essentially laminar flow, either under positive or negative pressure. Preferably, most of the components of the butterfly damper 30, which will be in the presence of the flowing air and/or gas, will be derived from a group of materials which all will withstand possible corrosion and possible abrasion, that might otherwise occur during the flow of air and/or gas, which might possibly contain contaminants. This group of materials includes all thermosetting resin plastics, all thermoplastic materials, urethane, and castable plastics and rubbers.

Throughout all the embodiments, the interior seating and sealing locale 32 for the blade 34 of the butterfly damper 30 is located, where the continuous inner flexible cylindrical surface structure 36 made of a resilient material, is slightly reduced in internal diameter 37 for a short distance, to be ready to completely receive the entire circumferential edge 38 of the closed blade 34 and to then create a leak free closure of the butterfly damper and the duct work 40. The slight reduction in the internal diameter 37 for a short distance is an intended purpose of all the methods of manufacturing the butterfly damper 30, to create the interior seating and sealing locale 32.

During each method of manufacture, until near the conclusion of the manufacturing, the entire internal diameter 42 of the inner cylindrical surface structure 36, made of resilient material, is kept uniform, preferably by using a mandrel 44 over which the inner cylindrical surface structure 36 is arranged. Then around the exterior of the central portion 46 of this inner flexible cylindrical surface structure 36, a short width of a circumferential portion 50 of a compressible material is positioned. Thereafter, during a selected method of manufacture, this circumferential portion 50 of a compressible material is compressed between the subsequently formed outer cylindrical surface structure 52 made of a fixed strong material, and the inner flexible cylindrical surface structure 36 made of a resilient material.

Then at the conclusion of a manufacturing method, when, for example, a mandrel 44 is removed, the initially compressed circumferential portion 50 of the compressible material expands sufficiently to cause the wanted relatively slight reduction in the internal diameter 37 of the adjacent portions of the inner cylindrical surface structure 36 made of resilient material. This reduced internal diameter 37 portion of the inner flexible cylindrical surface structure 36 made of resilient material, which is adjacent to the circumferential portion 50 of the compressible material, becomes the seating and sealing locale 32. When the blade 34 of the butterfly damper 30 is closed, all of the circumferential edge 38 of the blade 34 is in sealing contact with the reduced internal diameter portion 37, providing the seating and sealing locale 32, and the air and/or gas flow is completely stopped.

Some of the Places Where the Butterfly Dampers are Used

Figure 1:
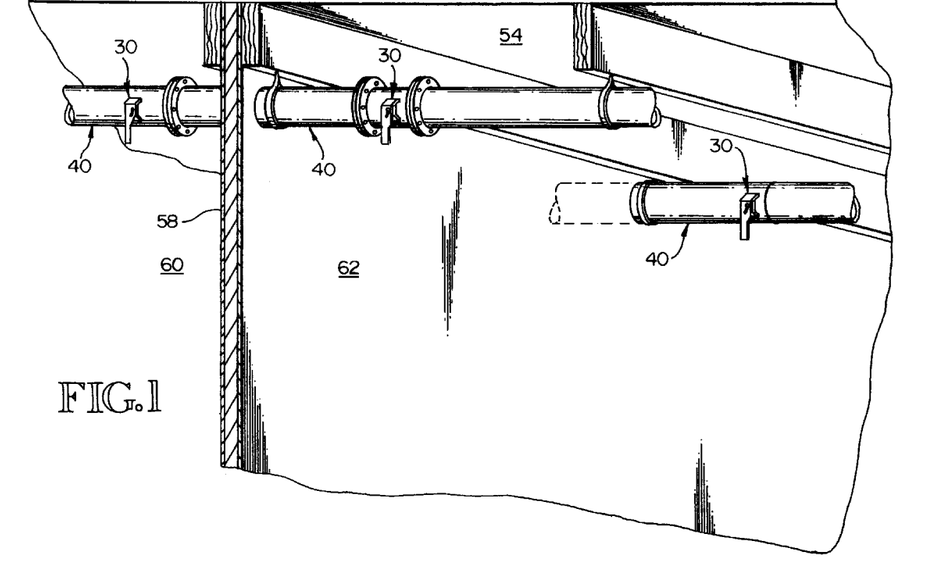
FIG. 1 is a partial perspective view of a building interior showing an overhead duct work through which air and/or gas is flowing, unless respective butterfly dampers are fully closed, and three different appearing butterfly dampers are illustrated, with one having two flanges, another one having one flange, and another one having no flanges.

As shown in FIG. 1, the butterfly dampers 30 are installed in duct work 40 supported generally in the overhead volume 54 of a building 56, preferably near dividing walls 58, or at the end of a branch line. Then if there is a need to stop the flow of air and/or gas from one room 60 to another room 62, or elsewhere, a selected respective butterfly damper 30 can be closed completely, thereby stopping the flow through a particular duct work volume.

In this FIG. 1, one butterfly damper 30 is shown without flanges. Another one has one flange 64 and another one has two flanges 64. The persons designing a building 56 and/or the duct work 40 in the building 56, have these options in respect to specifying where the flanges will be positioned.

Although hand control handles 66 are illustrated, powered handles, often remotely controlled, are installed where frequent opening and closing sequences occur in respect to some butterfly dampers 30. Whether hand operated or remotely powered operated, the blade 34 is readily closed, stopping all the air and/or gas flow through the butterfly damper 30 and the duct work 40 extending beyond the butterfly damper 30.

Figure 2:
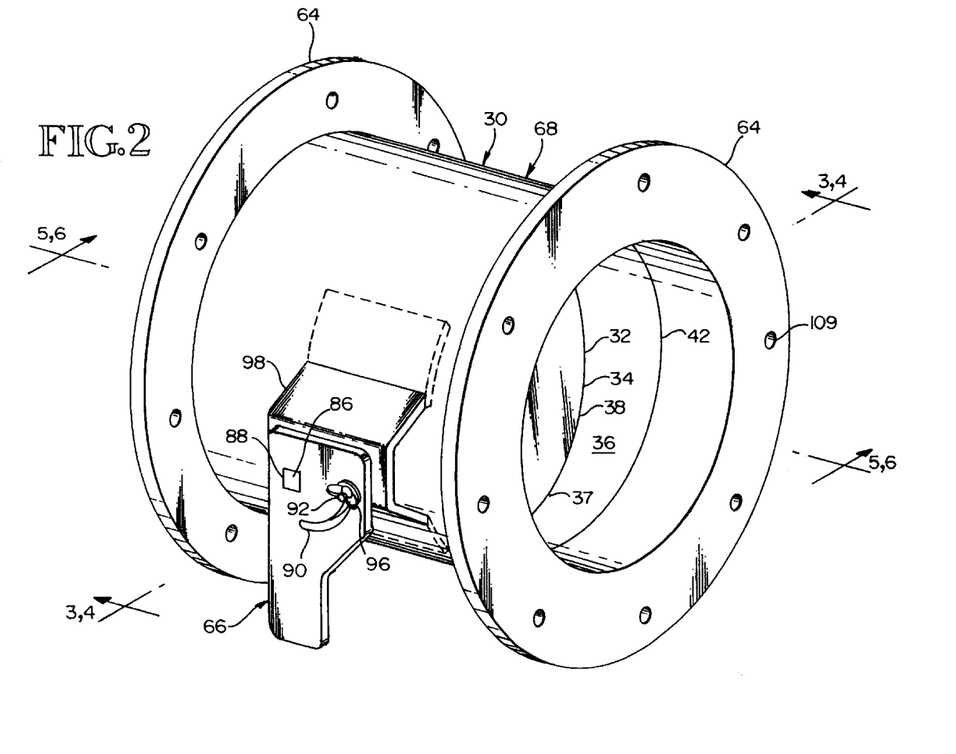
FIG. 2 is a perspective view of a butterfly damper having two flanges, illustrating a manual control for moving a blade shown in the fully closed position, wherein the blade at the circumference thereof is fully contacting an inner cylindrical surface structure made of a resilient material, which in turn in the locale of the closed blade is moved radially inwardly, upon the expansion of a previously compressed adjacent portion of a resilient material.

The Embodiment of the Butterfly Damper Referred to as the Fiberglass Reinforced Plastic Butterfly Damper and the Method of its Manufacture By using a rotating mandrel manufacturing method, as schematically illustrated in FIGS. 9 through 12, a fiberglass reinforced plastic butterfly damper 30 may be made having no flanges, one flange 64 or two flanges 64, as shown in FIG. 1. A two flange butterfly damper 30 is illustrated in FIGS. 1 through 8. The resulting model or embodiment as it appears before installation is shown in FIG. 2, having flanges 64 at each end.

Figures 3, 4, 5, 6:
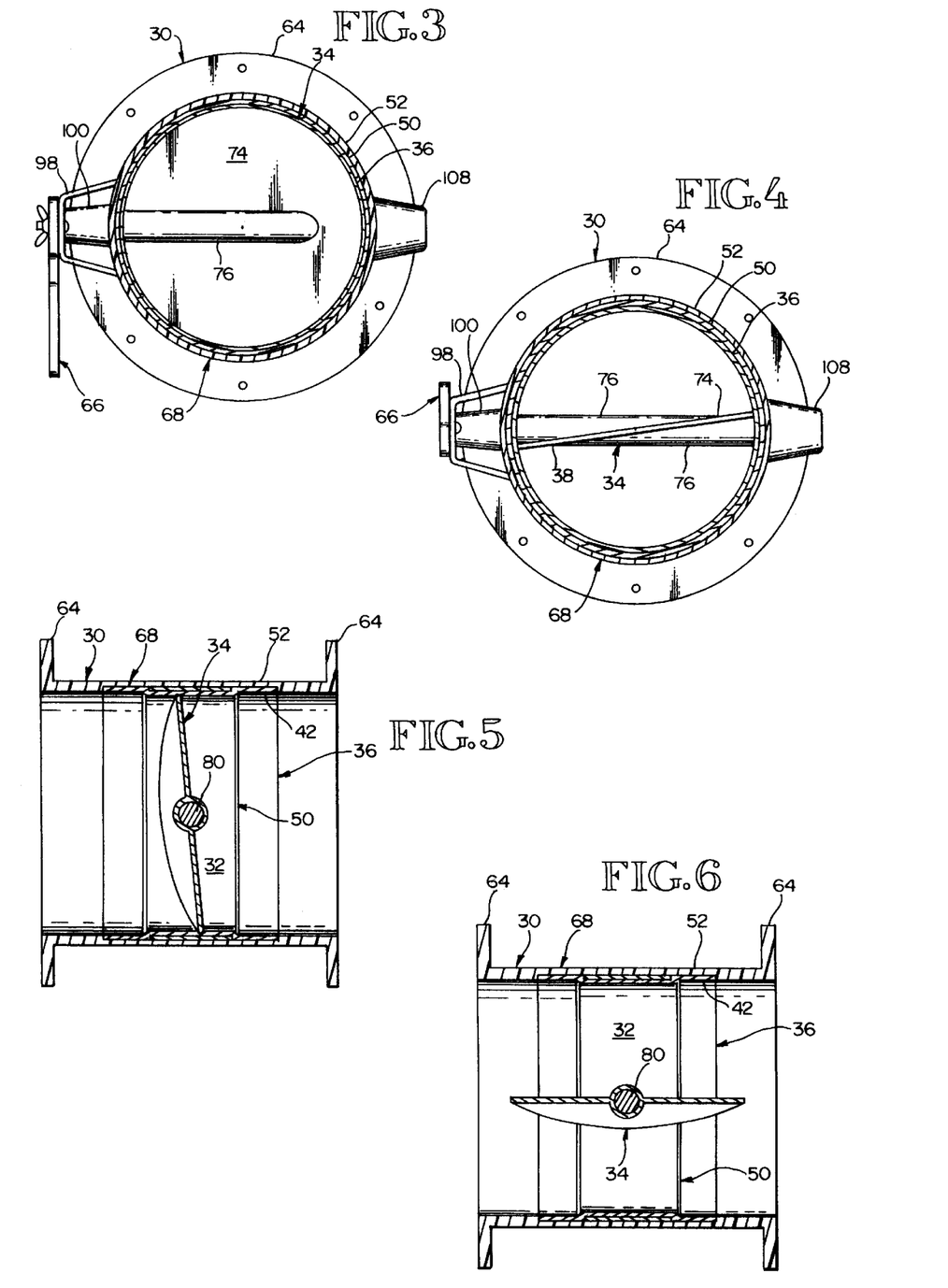
FIG. 3 is a transverse cross sectional view, taken along line 3—3 of FIG. 2, illustrating the blade in the fully closed position of the butterfly damper.
FIG. 4 is a transverse cross sectional view, taken along line 4—4 of FIG. 2, showing the blade in the fully opened position.
FIG. 5 is a longitudinal cross sectional view, taken along line 5—5 of FIG. 2, illustrating the blade in the fully closed position of the butterfly damper.
FIG. 6 is a longitudinal cross sectional view, taken along line 6—6 of FIG. 2, showing the blade in the filly opened position.

The blade 34 is moved by turning the handle 66. The closed position of the blade 34 is illustrated in FIGS. 2, 3 and 5. The open position of the blade 34 is shown in FIGS. 4 and 6. Intermediate positions of the blade 34 are used, when necessary, to control the flow rate. When the blade 34 is in the open position, the air and/or gas flow through the butterfly damper 30 is a substantially laminar flow, because the reduced internal diameter 37 of the seating and sealing locale 32 is comparatively minor. Therefore, there is very limited interference with the flow of air and/or gas through the duct work 40.

Throughout all the embodiments of various inside diameters, the reduced internal diameter 37, in respect to the difference between the internal diameter 42 and the reduced internal diameter 37 is always essentially the same. There is very limited interference with the flow of air and/or gas through the duct work 40, in respect to any of the sizes of the duct work 40 and the respective sizes of the butterfly damper 30.

Figure 7:
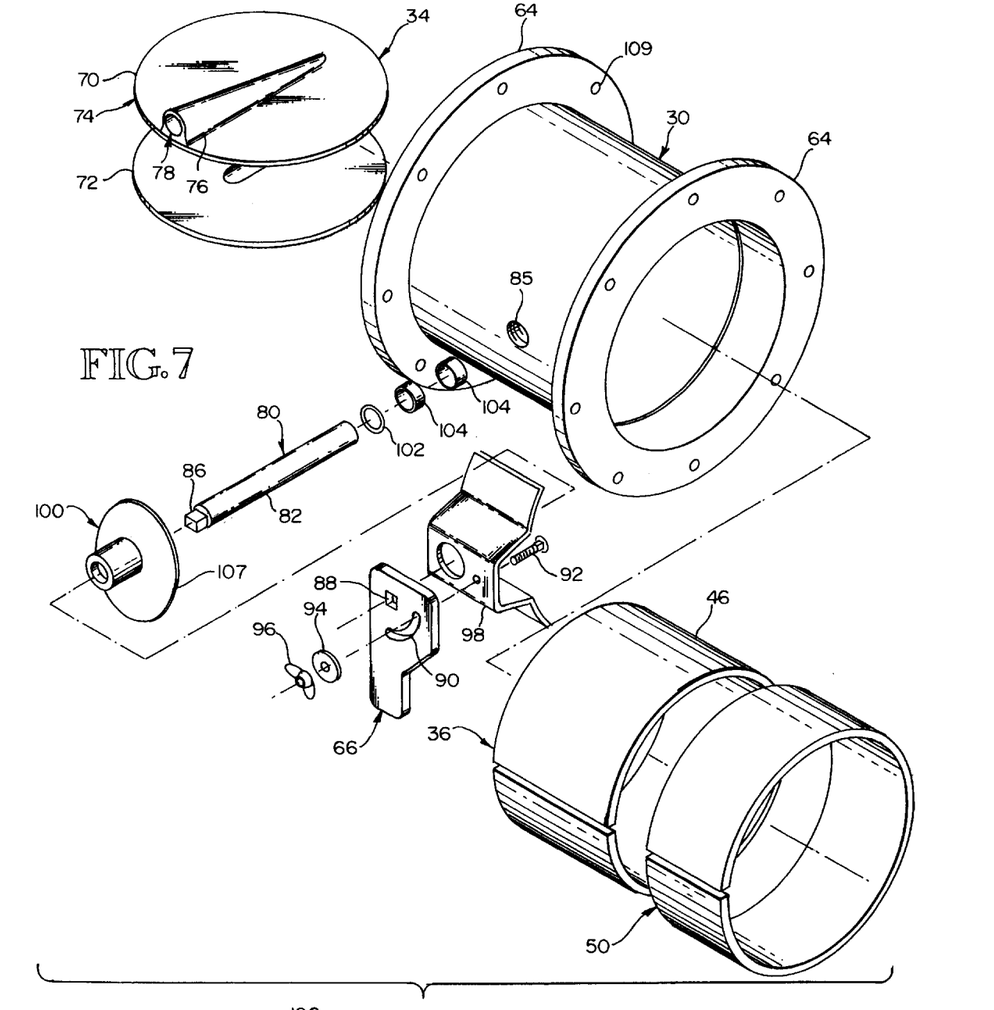
Figure 8:
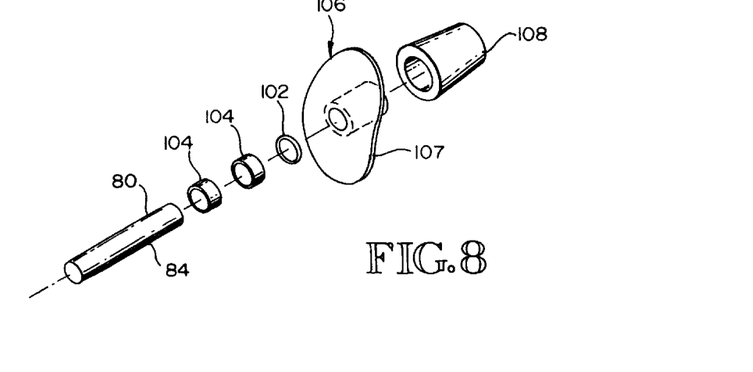
FIG. 8 is a partial exploded perspective view of portions of the butterfly damper, which are not shown in FIG. 7, illustrating how the other shaft portion is mounted to the outer cylindrical surface structure, via a sub assembly, also including the bearings, sealing ring, and an eventually assembled full air and/or gas tight housing located about the end of the shaft and in effect sealably secured to outer cylindrical surface structure.

The various parts, when assembled, as shown in FIG. 2, are separated apart from one another in the exploded views of FIGS. 7 and 8. The principal body portion 68 of the butterfly damper 30 has an outer cylindrical surface structure 52 made of a fixed strong material. Inside, the principal body portion 68 of the butterfly damper 30 has the short circumferential portion of the compressible material 50, which is not visible when the butterfly damper 30 is completed. Also further inside, the principal body portion 68 of the butterfly damper 30 has the full length flexible inner cylindrical surface structure 36 made of a resilient material, which guides the flow of the air and/or gas flow through the butterfly damper 30.

Where the short circumferential portion of the compressible material 50 is located, when it has expanded at the end of the manufacturing methods, the adjacent central portion of the full length inner flexible cylindrical surface structure 36 are moved radially inwardly to a reduced internal diameter 37, thereby creating the seating and sealing locale 32. The inside diameter of the duct body portion of this butterfly damper, which is determined by the inside diameter of the resilient material, commences and ends in a same maximum internal diameter, and has a reduced internal diameter throughout the central portion 33, where the compressible material is located. Therefore, without other special manufacturing methods, such as machining, molding or casting, a seating and sealing locale 32 is created to receive the full circumferential edge 38 of the blade 34. Moreover, the seating and sealing locale 32 is positioned in a very limited interference contour change of the otherwise unchanged internal diameter 42 of the inner flexible cylindrical surface structure 36, made of a resilient material, which is always the internal diameter 42 of the principal body portion 68 of this butterfly damper 30.

The blade 34 is preferably made of fiberglass materials. Often it is initially made in two parts 70. Each part 70 has one half 72 of the disc portion 74, which in turn includes one half 76 of the centered shaft receiving portion 78.

The blade 34 rotates about a full length shaft 80 made of plastic materials, which may or may not be made of two longitudinal portions 82, 84. The two portions, subsequently adhered together, are used during a more convenient assembly procedure. Aligned holes 84 are provided extending through the principal body portion 68 to receive the shaft 80.

At the handle end of the shaft 80, a squared cross sectional portion 86 is integrally formed to interfit with the squared cross sectional opening portion 88 of the handle 66. The handle 66 has a curved slot 90, which slidably receives threaded travel stop pin 92, which is secured, by using the washer 94 and wing nut 96, to the mounting bracket 98, which in turn is secured to the principal body portion 68.

A bearing housing 100, preferably made of plastic materials, and secured to the principal body portion 68, and positioned in line with and inside the mounting bracket 98, receives an O-ring 102 positioned about the shaft 80, and also one or two bearings 104 positioned about the shaft 80.

At the other end of the shaft 80, a bearing housing 106 having a flange 107 is secured to the principal body portion 68. An O-ring 102 and bearings 104 are positioned within the bearing housing 106. Then to complete the sealing created by the O-ring 102, if that ever becomes necessary, a sealing cover 108 shaped like a cup having a top rim and an extending integral, i.e., sealed, bottom is placed over the bearing housing 106, and consequently over the bearings 104, the O-ring 102, and the end of the shaft 80. Thereafter, the top rim of the cup shaped cover 108 is integrally secured sealed to the flange portion 107 of the bearing housing 106, which just previously has been integrally secured to the principal body portion 68, thereby making a leak proof assembly.

After this assembly of the components, or at an earlier step of a manufacturing process, the flanges 64, if specified, are made of plastic materials. Then they are positioned adjacent the principal body portion 68 and thereafter integrally secured to it. Holes 109 are provided in the flanges 64 to receive fastener assemblies during the installation of the butterfly damper.

Figure 9:
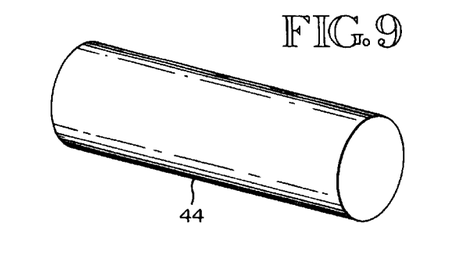
FIG. 9 is a perspective view of a mandrel which is used during various manufacturing methods which are followed to produce the butterfly damper.
Figure 10:
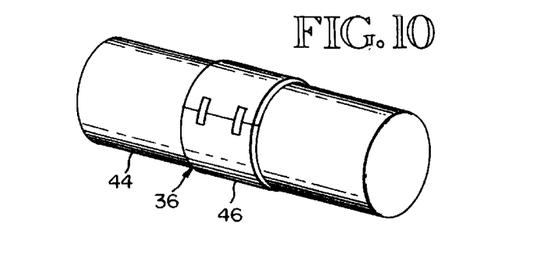
FIG. 10 is a perspective view of the mandrel about which is placed the inner flexible cylindrical surface structure made of a resilient material, and at two optional places a fastening material is positioned to temporarily hold in place this inner cylindrical surface structure.

In respect to the embodiment of the butterfly damper 30, which is referred to as the fiberglass reinforced plastic butterfly damper 30, some of the method steps followed in making it, are schematically illustrated in FIGS. 9 through 12. A mandrel 44 of a powered lathe-like turning machine, not shown, is shown in FIG. 9. It is covered in part with an inner cylindrical surface structure 36 made of a resilient material, as shown in FIG. 10. Preferably, this material is one eighth of an inch thick and it is derived from a sheet of rubber specified at a durometer of fifty. This rubber subsequently serves as a full length lining of the butterfly damper 30. To keep the rubber material in place, temporary fastening material 110 is arranged in short narrow pieces.

Figure 11:
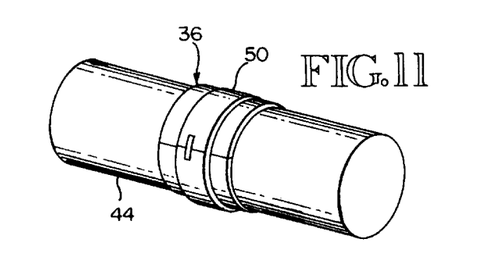
FIG. 11 is a perspective view of the mandrel, as shown in FIG. 10, having in addition to the inner flexible cylindrical surface structure made of resilient material, the adjacent positioning of a circumferential portion of a compressible material about the central portions of the inner flexible cylindrical surface structure, in turn kept in place with a fastening material, thereby completing the starting steps of several methods of making the butterfly damper.

Subsequently, preferably at the central circumferential portion of the inner cylindrical surface structure 36 made of resilient material, such as the fifty durometer rubber, as shown in FIG. 11, a short circumferential portion 50 of compressible material is placed around this inner cylindrical surface structure 36, and so positioned by using another piece of the temporary fastening material 110. Preferably, three eighths of an inch thick sponge rubber is used as this compressible material 50.

Figure 12:
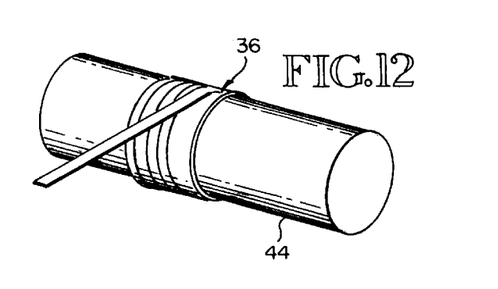
FIG. 12 is a perspective view of the starting windings of fiberglass materials being undertaken in the presence of resins, and under tension, whereby the compressible material is compressed against the central portion of the inner flexible cylindrical surface structure, as these windings continue, as the outer cylindrical surface structure made of a strong material is being completed in this fiberglass reinforced plastic manufacturing method of producing the butterfly damper.
Figure 13:
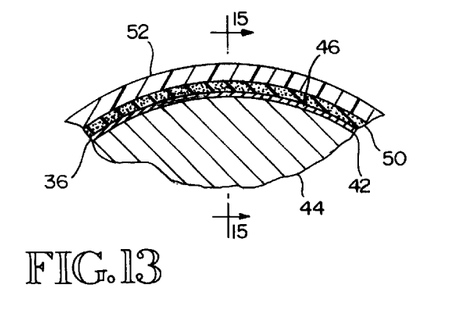
FIG. 13 is a partial transverse sectional view, taken when the butterfly damper portions are still positioned on the mandrel, after the fiberglass reinforced plastic manufacturing method has been completed, as this method is indicated in FIG. 12, wherein the compressible material has been compressed.
Figure 15:
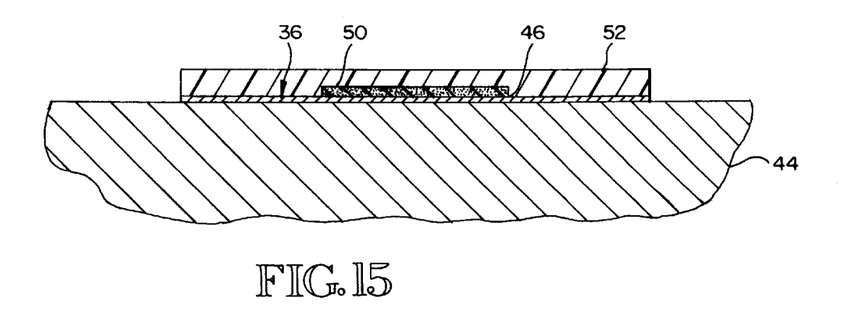
FIG. 15 is a partial longitudinal sectional view, taken along line 15—15 of FIG. 13, illustrating the positioning of: the mandrel, the inner flexible cylindrical surface structure made of a resilient material; the compressed circumferential portion of compressible material; and the surrounding formed outer cylindrical surface structure made of a fixed strong material, as they are arranged before removal from the mandrel, in respect to the fiberglass reinforced plastic manufacturing method, and when the mandrel is removed, the compressible material expands as shown in FIG. 14 to move the central portion of the inner flexible cylindrical surface structure made of resilient material into the seating and sealing locale of the blade of the butterfly valve.

Thereafter, as the mandrel 44 is rotated, as shown in FIG. 12 and in the presence of resins, fiberglass strands are wound, while under tensile forces, about the prearranged inner cylindrical surface structure 36 and the short circumferential portion 50 of the compressible material, to eventually complete the outer cylindrical surface 52 made of strong material. During this tensile force winding, the compressible material is compressed, as illustrated in FIGS. 13 and 15, substantially compressing the short circumferential portion 50 of the compressible material.

Figure 14:
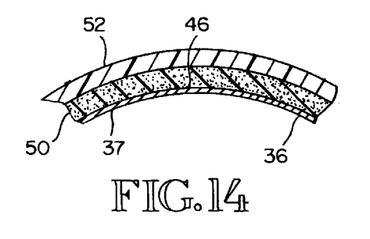
FIG. 14 is a partial transverse sectional view, taken when the butterfly damper portions have been removed from the mandrel, after the fiberglass reinforced plastic manufacturing method has been completed, as this method is indicated in FIG. 12, wherein the compressible material had been compressed, but thereafter, when the mandrel is no longer present, the compressed compressible portion of resilient material expands to in turn move the adjacent central portion of the inner cylindrical surface structure made of resilient material radially inwardly, to form a seating and sealing locale to receive the circumferential portions of the blade, when the butterfly damper is fully closed, stopping all the flow of air and/or gas.

Subsequently, when the then formed principal body portion 68, also referred to as the duct body portion, is separated from the mandrel 44, the short circumferential portion 50 of the compressible material tries to return to its original thickness. To a considerable extent this occurs, as shown in FIG. 14, causing the formation of a reduced internal diameter 37 of the inner flexible cylindrical surface structure 36, which is located adjacent to short circumferential portion 50 of the compressible material. This reduced internal diameter 37 portion becomes the seating and sealing locale 32 of the butterfly damper, to fully receive the circumferential edge 38 of the blade 34, when the blade 34 is moved into its closed position to fully stop the flow of the air and/or gas. The butterfly damper 30, when the blade 34 is closed, is leak free in respect to stopping the flow, when tested under a six inch column of water.

The Preferred Diagonal Positioning of Both the Blade and Also the Short Circumferential Portion of the Compressible Material Preferably, as shown in FIG. 5, the blade 34, when closed is in an offset diagonal position. To accomplish this positioning, blade 34 is made in an elliptical disc shape 114. Also the centered shaft receiving portion 78 is offset with respect to the elliptical disc shape 114. Therefore the blade 34 rotates about a transverse diameter axis, after it is mounted on the shaft 80, for rotation within the butterfly damper 30.

Figure 16:
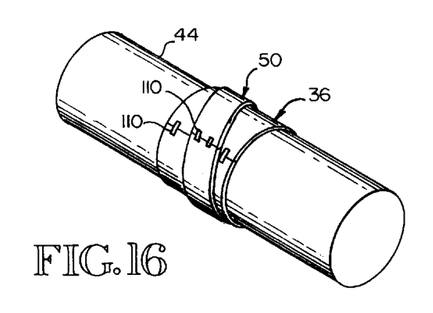
FIGS. 16 and 17 in perspective views, illustrate, in reference to the starting steps of most methods of manufacturing the butterfly valve, how the circumferential portion of the compressible material is formed initially and so arranged to be on a diagonal to match the diagonal positioning of the blade of the butterfly valve, whereby throughout the seating and sealing locale, the circumferential portion of the compressible material extends in equal distances in either longitudinal direction, from where the circumference of the blade, in the diagonal fully closed position, contacts the inner cylindrical surface structure made of resilient material, where the internal diameter has been reduced, upon the expansion of the circumferential portion of the compressible material.
Figure 17:
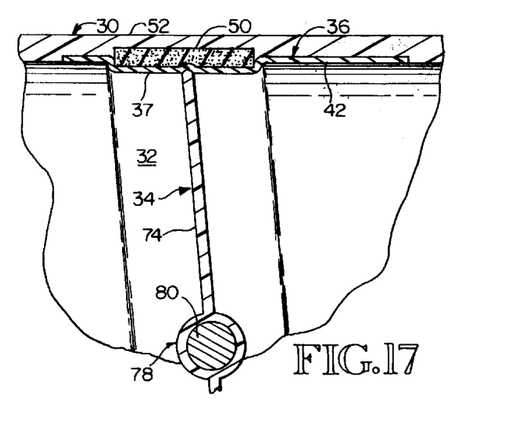

Then to match the diagonal offset position of the closed blade 34, the short circumferential portion 50 of compressible material is preferably arranged in a like diagonal position, as illustrated in FIGS. 16 and 17. This arrangement insures better overall seating and sealing of the blade 34. The blade 34 in the diagonal offset position seals better, and the center of the short circumferential portion of the compressible material 50 is always substantially in line with the circumferential edge 38 of the blade 34. The equal spacing of the seating and sealing locale 32 on either side of the circumferential edge 38 of the blade 34, i.e. the equal spacing of the reduced internal diameter 37 portion of the inner flexible cylindrical surface structure 36 on either side of the circumferential edge 38 of the blade 34, i.e. the equal spacing of the central portion 33 of the inner flexible cylindrical surface structure 36 on either side of the circumferential edge 38 of the blade 34, further insures the very adequate sealing of the air and/or gas flow, when the blade 34 is in the closed position of the butterfly damper 30.

Figure 18:
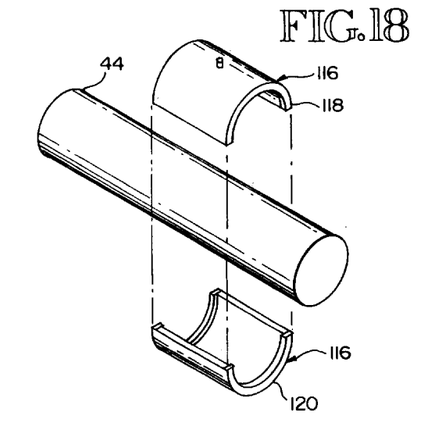
FIG. 18 is a perspective view illustrating the start of a manufacturing method, wherein the butterfly damper is manufactured by using an injection molding method or process, showing the relative pre-positioning of the mandrel and the top and bottom portions of the mold.

The Embodiment of the Butterfly Damper Referred to as the Molded Plastic Butterfly Damper, and the Method of its Manufacture Instead of creating the outer cylindrical surface structure 52 made of strong material by utilizing the tensioned winding of fiberglass strands in the presence of resins, as illustrated in FIGS. 9 through 12, the formation of the outer cylindrical surface structure 52 may be also undertaken by utilizing molds 116, in the sections 118, 120, as schematically illustrated in FIGS. 18 through 25. A mandrel 44 is positioned to be subsequently surrounded by the sections 118, 120 of the mold 116, as illustrated in FIG. 18. Then the inner cylindrical surface structure 36, preferably made of one eighth of an inch thick fifty durometer rubber, is positioned about the mandrel 44, and kept in position by using the temporary fastening material 110.

Figure 20:
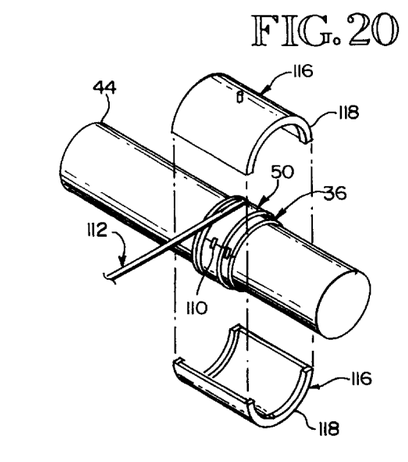
FIG. 20 is a perspective view showing how the circumferential portion of compressible material has been placed around the inner cylindrical surface structure made of a resilient material, and then the start of applying a binding material is illustrated, whereby the compressible material is compressed about the inner cylindrical surface structure made of a resilient material previously positioned on the mandrel, before the mold is positioned.
Figure 21:
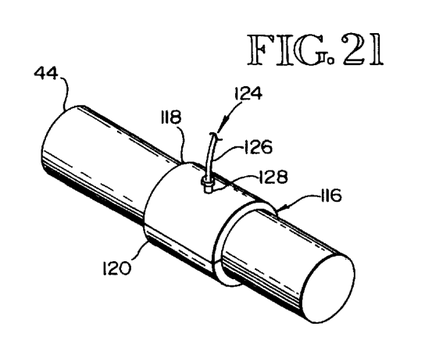
FIG. 21 is a perspective view illustrating the securement of the top and bottom portions of the mold about the components assembled, as shown in FIG. 20, indicating how plastic materials are injected into the surrounding spaces inside the mold, to thereby create the outer cylindrical surface structure made of a strong material.

Subsequently, the short circumferential portion 50 of compressible material, such as three eighths of an inch thick sponge rubber, is positioned over the central portion of the inner cylindrical surface structure 36, and kept in position by using the temporary fastening material 110, as shown in FIG. 20. Also shown in FIG. 20, is the wrapping of a strong webbing material 122 in a sufficient number of limited wrappings to compress the short circumferential portion of the compressible material 50.

Figure 22:
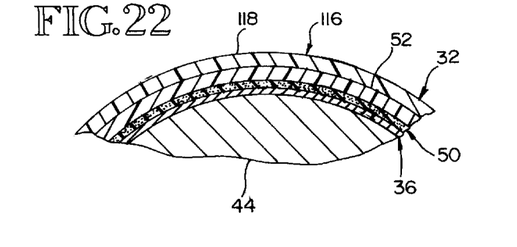
FIG. 22 is a partial transverse cross sectional view indicating the arrangement of the components, as shown in FIGS. 20 and 21, as they are arranged about the mandrel and within the mold, particularly showing the compressed circumferential portion of compressible material.

Then the sections 118, 120 of the mold 116 are secured in place, and flowing plastic material 124 is injected through the conduit 126 and fitting 128, from a source not shown. After the curing time of the plastic material 124, and while the mandrel 44 is still in place, and the mold is still in place, as shown in FIG. 22, the short circumferential portion 50 of the compressible material is well compressed between the outer cylindrical surface structure made of a strong plastic material, and the inner cylindrical surface structure 36 made of a resilient material.

Figure 23:
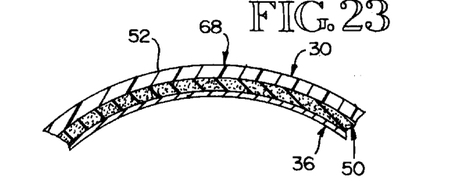
FIG. 23 is a partial transverse cross sectional view, similar to FIG. 22, illustrating the components remaining, after the mandrel and the mold have been removed, and the circumferential portion of compressible material has expanded, to thereby move the central portion of the inner flexible cylindrical surface structure made of a resilient material, radially inwardly to create the seating and sealing locale, where the closed blade at the circumference makes the seating and sealing contact.

Then after the sections 118, 120 of the mold 116 are removed, and the mandrel is cleared from the principal body portion 68 of the butterfly damper 30, as shown in FIG. 23, the short circumferential portion 50 of the compressible material is freed sufficiently to expand and move the adjacent portion of the inner cylindrical surface structure 36 radially inwardly to a reduced diameter 37, and thereby create the seating and sealing locale 32. When the blade 34 is in the closed position, its circumferential edge 38 is in full contact with the inner cylindrical surface structure 36, preferably made of one eighth inch thick fifty durometer rubber at this seating and sealing locale 32 and throughout the butterfly damper 30.

The diagonal arrangement, i.e. offset arrangement, of an elliptical blade 34, along with the diagonal arrangement of the short circumferential portion 50 of a compressible material, such as sponge rubber which is three eighths of an inch thick, may also be undertaken when using this molding method of manufacturing the butterfly damper 30.

Figure 24:
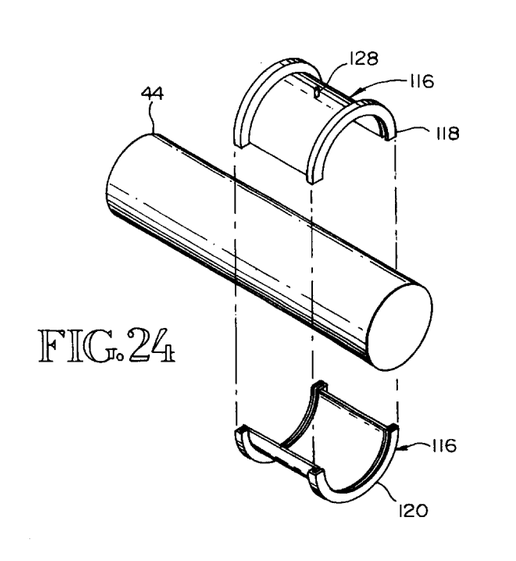
FIG. 24 is a perspective view, similar to FIG. 18, showing how the mold is made, so the resulting butterfly damper has a flange at each end.
Figure 25:
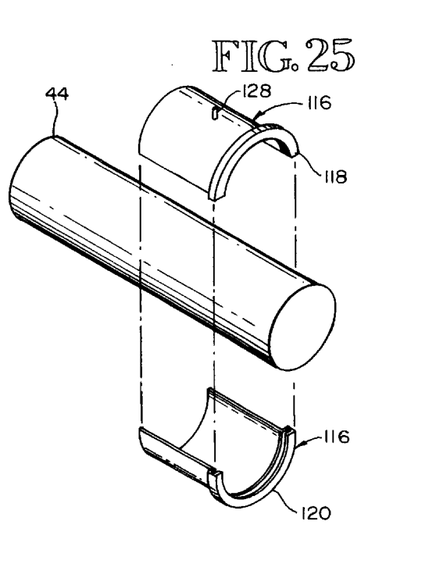
FIG. 25 is a perspective view similar to FIGS. 18 and 24, showing how the mold is made, so the resulting butterfly damper has a flange at one end.

As illustrated in FIGS. 24 and 25, the molds are provided to create two or one flanges at the same time the outer cylindrical surface structure 52 is being molded.

The Embodiments of the Butterfly Damper and Other Methods of Manufacture

In respect to other embodiments of the butterfly damper and the respective methods of manufacture, they all center around the arrangement of inner flexible cylindrical surface structure 36, and the positioning, about the central portion of this structure 36, of the short circumferential portion 50 of compressible material. Then, during the manufacturing process or method, the compressible material is compressed. Thereafter, at the conclusion of the method, the short circumferential portion 50 expands sufficiently to move the adjacent central portion 33 of the inner cylindrical surface structure 36, utilizing its resiliency, to reduce the internal diameter 37 at this seating and sealing locale 32. Thereafter, when the blade 34 is closed, its circumferential edge 38 is in full sealing contact with the resilient inner cylindrical surface structure 36.

Figure 19:
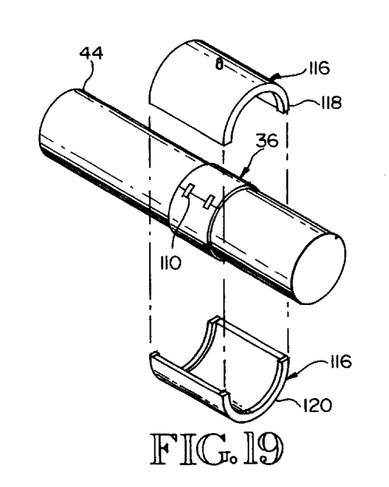
FIG. 19 is a perspective view showing how the inner cylindrical surface structure made of a resilient material has been placed around the mandrel and secured by a fastening material, before the mold is positioned.
Figure 26:
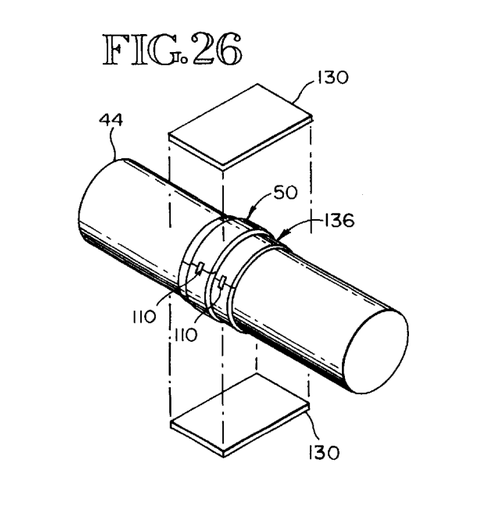
FIG. 26 is a perspective view, illustrating the starting steps of arranging the mandrel and materials to follow another method of manufacture wherein sheets of plastic material are cut to size, then heated, then formed and moved about the other materials, and sealed into place, to form the outer cylindrical strong surface structure, and thereby complete the butterfly damper.
Figure 27:
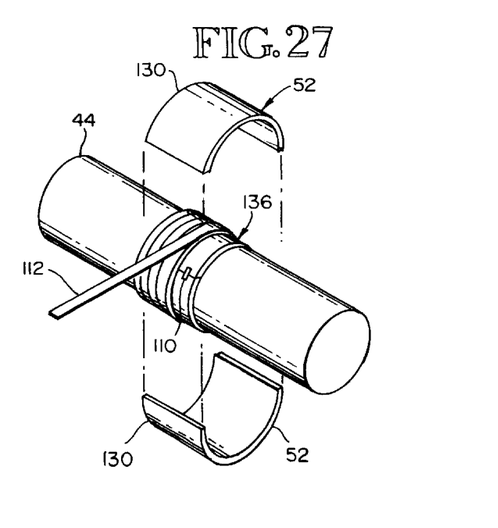
FIG. 27 is a perspective view indicating additional steps undertaken in the method of manufacture, shown in FIG. 26, showing the forming of the cut to size sheet of plastic material, whereby the two formed sheets will become the outer cylindrical strong surface structure, and also showing how the short circumferential portion of the compressible material is tightly wrapped under tension to compress it, before the final placement of the two formed portions of plastic, which when in place complete the principal body portion of the butterfly damper.

For an example, of other possible embodiments, and in referring to FIGS. 18 through 20, the same starting steps could be undertaken. Then, instead of using molds and the injection of a flowing plastic, a method of forming the outer cylindrical surface structure of strong material 52, could be undertaken by cutting sheet plastic material 130 to the specified longitudinal length and to the specified circumferential length, as indicated in FIGS. 26 and 27. Thereafter, by heating and compressibly conforming these cut sheets of plastic material, the outer cylindrical surface structure of strong material 52 would be completed creating another embodiment of the butterfly damper 30.

In reference to all embodiments, when the butterfly damper 30 is made to be used in larger diameter duct works 40, the blade is formed with molded in spaced stiffeners. Also the blade can be made in two transverse sections, which are subsequently secured together. This procedure has manufacturing advantages and/or subsequent assembly advantages.

Selection of Material Used in Manufacturing the Butterfly Damper

Throughout the embodiments of the butterfly damper 30, one of the objectives, in reference to the materials to be used, is to select materials, which if they are to be contacted or might be contacted by the flow of air and/or gas, they will not be effected in any way, which would tend to destroy them, especially by corrosive and/or abrasive destruction. Another objective is to select readily available materials of comparatively lower cost that are readily formed by comparatively lower cost manufacturing methods.

In making butterfly dampers 30 in sizes, for example, ranging from four inches through ninety six inches in diameter, the selection of materials in reference to the functional parts is as follows:

The materials for the body construction in reference to the outer cylindrical surface structure of a resulting fixed strong material 52 are Polyester, Vinylester, Epoxy, and the same materials as specified for use in making the duct work 40;

The materials for the blade 34 are selected from Polyester, Vinylester, and Epoxy;

The materials for the O-ring 102 are selected from Neoprene, Buna N, EPDMA, Viton, Butyl, and Fluorocarbon;

The materials for the shaft 80 are selected from Polyester, Vinylester, Epoxy, and 316SS;

The materials for the seat material, i.e. the inner flexible cylindrical surface structure 36 are selected from Neoprene, Viton, EPDM, Urethane, Silicone, and Buna N; and The material for the bearings is a Teflon material.

Some Other Interesting Resulting Features and Considerations Realized When These Butterfly Dampers are Utilized The zero leak capability of these butterfly dampers 30 should continue on for a long time. If they remain installed and operated for a very long time, especially in reference to corrosion and/or abrasion, and the inner cylindrical surface structure 36 made of resilient material should start to fail or does fail, the butterfly damper's principal body portion 68 is still serving as a backup. In reference to the fiberglass reinforced plastic butterfly damper 30, the principal body portion 68 is still fully protected by its own resin rich liner, and it is of equal strength to the strength of the duct work 40 into which the butterfly damper 30 is installed.

The offset elliptical blade 34 during manufacture is in effect laminated about the shaft 80. When the blade 34 is made, by forming the one half disc portions 72, each having the one half centered shaft receiving portions 76, then this lamination step is easily undertaken in respect to the uniform distribution of the bonding materials. The shaft 80 may be in one original piece, or in two portions 82, 84. The two portions are helpful during some assembly procedure. Yet the final assembly, always preferably results in an overall one piece continuing shaft 80. This utilization of the one piece continuous shaft 80 and its lamination within the blade 34 results in the better continuous alignment of the shaft, and the sealing fit of the blade 34 when closed. There is little chance for a mechanical failure. Moreover, there is little chance for a corrosive and/or an abrasive attack on the shaft 80 or the blade 34.

Where the shaft 80 passes through the resilient inner cylindrical surface structure 36, the tolerance is limited, whereby there is a sealing effect which is comparable to the sealing effect created by using an O-ring 102. In respect to O-rings 102, a selected number of O-rings 102 are used. However, in reference, especially to the fiberglass reinforced plastic butterfly damper 30, the shaft bearings are also enclosed in substantially enclosing housing 100 at the handle location, and in the fully enclosed sealing cover 108 shaped as a cup located at the end of the shaft 80, opposite to the handle end. The rim of the cup shaped fully enclosed sealing cover 108 is sealably secured to the flange portion 107 of the bearing housing 106, and together they are sealed to this duct body portion 68, i.e. principal body portion 68, of the butterfly damper 30. This overall sealing arrangement makes the butterfly damper 30 essentially leak free during a long operating life, always keeping the air and/or gas flowing through the butterfly damper 30 without leakage whether under positive or negative pressure. Then when necessary, the butterfly damper 30 is operated to regulate the flow, or to stop the flow all together, without any leaks occurring about the closed blade 34, or through the principal body portion 68 of this butterfly damper 30.

We claim:

1. A method of manufacturing a butterfly damper for installation in duct work, through which air and/or gases will be flowing, centering on the utilization of fiberglass reinforced plastic manufacturing apparatus, comprising:
   a. positioning of a mandrel for the controllable rotation thereof;
   b. placing of a resilient material arranged as a removable sleeve thereof about the mandrel, the resilient material selected to withstand the flow of air and/or gases, which may be carrying abrasive particles and corrosive substances;
   c. placing of a circumferential strip of compressible material, which is always tending to return to the non compressed form thereof, about the resilient material arranged as a removable sleeve about the mandrel;
   d. applying resins about the exposed surfaces of both the resilient material arranged as a removable sleeve, and the circumferential strip of compressible material;
   e. applying fiberglass strengthening materials under tension during the rotation of the mandrel for their selective placement over the resins and the initially exposed surfaces of the resilient material arranged as a removable sleeve, and of the circumferential strip of compressible material, whereby this compressible material is substantially compressed;
   f. applying resins to form a protective coating;
   g. removing all of these materials, when cured, from the mandrel, as they then form a duct body portion, and then the compressible material, in trying to return to the original configuration thereof, causes the resilient material to move radially inwardly to form a seating and sealing locale to receive circumferential portions of a blade during the stopping of a flow of air and/or gases through this butterfly damper;
   h. creating two holes, transversely opposite one another, through all of these materials, which have created the duct body portion;
   i. inserting a blade in the duct body portion to the locale where the two holes have been created;
   j. inserting a shaft through the holes;
   k. securing the shaft to the blade;
   l. securing bearings to the duct body portion to receive the shaft, at the ends thereof; and
   m. utilizing seals about the shaft, at the ends thereof, to prevent the leakage of air and/or gases from the interior of the duct body portion past the shaft, at the ends thereof.

2. A method of manufacturing a butterfly damper, as claimed in claim 1, comprising, in addition,
   installing an actuator secured to one end of the shaft for use when the blade is pivoted within the duct body portion.

3. A method of manufacturing a butterfly damper, as claimed in claim 1, wherein the blade is made of two portions, each portion having respective air and/or gas flow stopping portions, and respective shaft receiving portions.

4. A method of manufacturing a butterfly damper, as claimed in claim 3, wherein the respective air and/or gas flow stopping portions and the respective shaft receiving portions are arranged at respective angles, whereby when a shaft is subsequently installed and the blade is positioned in the duct body portion, the blade is offset in respect to both the transverse axis and the longitudinal axis of the duct body portion.

5. A method of manufacturing a butterfly damper, as claimed in claim 1, wherein in reference to at least one end of the duct body portion,
   creating a flange portion.

6. A method of manufacturing a butterfly damper, as claimed in claim 1, wherein in reference to at least one end of the duct body portion,
   creating an extending duct body portion.

7. A method of manufacturing a butterfly damper, as claimed in claim 1,
   creating a full enclosure of the shaft at one end thereof, completely surrounding a full shaft end, and bearing thereof, and being firmly and sealably secured to the outer cylindrical surface structure, whereby this end of the shaft is completely sealed in respect to the air and/or gases being controlled by the operation of the butterfly damper.

8. A method of manufacturing a butterfly damper, as claimed in claim 7,
   creating another shaft enclosure of the shaft at the other end thereof, almost completely surrounding this other end of the full shaft, and bearing thereof, while leaving an extending portion of the full shaft for connecting to actuators used in controlling the position of the blade.

9. A method of manufacturing a butterfly damper for installation in duct work, through which air and/or gases will be flowing, centering on the utilization of plastic injection molding apparatus, comprising:
   a. positioning a mandrel;
   b. placing of a resilient material arranged as a removable sleeve thereof about the mandrel, the material selected being able to withstand the flow of air and/or gases, which may be carrying abrasive particles and/or corrosive substances;
   c. placing a circumferential strip of compressible material, which is always tending to return to the non-compressed form thereof, about the resilient material arranged as a removable sleeve about the mandrel;
   d. winding a binding material, under tension, about the circumferential strip of compressible material to compress this material against the resilient material arranged as a removable sleeve;
   e. arranging a sealable mold spaced about the assembly of the mandrel, resilient material, the compressible material, and the binding material;
   f. injecting a curable plastic material into the space within the sealable mold;
   g. removing the sealable mold after the curing of the injected curable plastic material;
   h. removing the mandrel, and then the compressible material, in trying to return to the original configuration thereof, causes the resilient material to move radially inwardly to form a seating and sealing locale to receive circumferential portions of a blade during the stopping of a flow of air and/or gases through this butterfly damper;
   i. creating two holes, transversely opposite one another, through all of these materials, which have created the duct body portion;

j. inserting a blade in the duot body portion to the locale where the two holes have been created;

k. inserting a shaft through the holes;

l. securing the shaft to the blade;

m. securing bearings to the duct body portion to receive the shaft, at the ends thereof; and n. utilizing seals about the shaft, at the end thereof, to prevent the leakage of air and/or gases from the interior of the duct body portion past the shaft, at the ends thereof.

10. A method of manufacturing a butterfly damper for installation in duct work, through which air and/or gases will be flowing, centering on the utilization of forming from a plastic sheet material a cylindrical duct body portion, comprising:

a. positioning a mandrel;

b. placing of a resilient material arranged as a removable sleeve thereof about the mandrel, the material selected being able to withstand the flow of air and/or gases, which may be carrying abrasive particles and/or corrosive substances;

c. placing a circumferential strip of compressible material, which is always tending to return to the non-compressed form thereof, about the resilient material arranged as a removable sleeve about the mandrel;

d. winding a binding material, under tension, about the circumferential strip of compressible material to compress this material against the resilient material arranged as a removable sleeve;

e. forming a plastic sheet material into a cylindrical body closely fitting the winding of binding material, the compressed strip of the compressible material, and the resilient material arranged as a removable sleeve about the mandrel;

f. removing the mandrel, and then the compressible material, in trying to return to the original configuration thereof, causes the resilient material to move radially inwardly to form a seating and sealing locale to receive circumferential portions of a blade during the stopping of a flow of air and/or gases through this butterfly damper;

g. creating two holes, transversely opposite one another, through all of these materials, which have created the duct body portion;

h. inserting a blade in the duct body portion to the locale where the two holes have been created;

i. inserting a shaft through the holes;

j. securing the shaft to the blade;

k. securing bearings to the duct body portion to receive the shaft, at the ends thereof; and l. utilizing seals about the shaft, at the ends thereof, to prevent the leakage of air and/or gases from the interior of the duct body portion past the shaft, at the ends thereof.

* * * * *